(12) United States Patent
Hallenbeck et al.

(10) Patent No.: US 6,225,387 B1
(45) Date of Patent: May 1, 2001

(54) STABILIZER BLEND FOR ORGANIC POLYMER COMPOSITIONS; STABILIZED POLYMER COMPOSITIONS AND METHOD OF STABILIZING POLYMERS

(75) Inventors: Donald Robert Hallenbeck, West Lafayette, IN (US); Cindy Nancy Doumen, Aarschot; Anne-Marie Prins, Landorp, both of (BE)

(73) Assignee: Great Lakes Chemical Corporation, West Lafayette, IN (US)

( * ) Notice: Subject to any disclaimer, the term of this patent is extended or adjusted under 35 U.S.C. 154(b) by 0 days.

(21) Appl. No.: 09/506,049

(22) Filed: Feb. 17, 2000

(51) Int. Cl.$^7$ ........................................................ C08K 5/57
(52) U.S. Cl. .................... 524/178; 524/180; 524/387; 524/424; 524/436
(58) Field of Search ...................... 524/178, 180, 524/387, 436, 412; 570/117, 102, 121, 118

(56) References Cited

U.S. PATENT DOCUMENTS

| | | | |
|---|---|---|---|
| 3,432,461 | * 3/1969 | Hill et al. ............................... | 524/180 |
| 4,022,750 | * 5/1977 | Takeya et al. ......................... | 524/180 |
| 4,089,912 | * 5/1978 | Levek et al. .......................... | 524/180 |
| 4,150,009 | * 4/1979 | Milenius ............................... | 524/371 |
| 4,154,718 | 5/1979 | Miyata et al. ....................... | 260/42.14 |
| 4,183,846 | 1/1980 | Larkin et al. ....................... | 260/45.75 |
| 4,217,258 | 8/1980 | Minagawa et al. .............. | 260/23 XA |
| 4,219,605 | * 8/1980 | Rohringer et al. .................... | 524/180 |
| 4,299,759 | 11/1981 | Miyata et al. .................. | 260/45.7 R |
| 4,427,816 | 1/1984 | Aoki et al. ........................... | 524/357 |
| 4,532,287 | * 7/1985 | Bill et al. ............................. | 524/371 |
| 4,558,083 | 12/1985 | Kugele ................................. | 524/181 |
| 4,593,059 | * 6/1986 | Mesch et al. ........................ | 524/181 |
| 4,675,356 | * 6/1987 | Miyata ................................. | 524/436 |
| 4,963,606 | * 10/1990 | Schleifstein ......................... | 524/371 |
| 5,106,898 | 4/1992 | Nosu et al. .......................... | 524/313 |
| 5,141,980 | 8/1992 | Ranceze et al. ..................... | 524/399 |
| 5,216,058 | 6/1993 | Visneski ............................... | 524/357 |
| 5,234,981 | 8/1993 | Arfiche et al. ....................... | 524/265 |
| 5,480,587 | * 1/1996 | Musselman et al. ................ | 524/424 |

OTHER PUBLICATIONS

Klender et al "Further Studies . . . Polyolefins" ANTEC Conference 1980, Baton Rouge, La. pp. 225–245, 1980.*
Plastics Additives Handbook, edited by R. Gächter and H. Müller, Hanser Publishers, 3rd Edition, pp. 281–308.

* cited by examiner

Primary Examiner—Veronica P. Hoke
(74) Attorney, Agent, or Firm—Marshall, O'Toole, Gerstein, Murray & Borun

(57) ABSTRACT

An organohalide-flame retardant polymer containing as a stabilizer blend:

a) an acid scavenger, for example a hydrotalcite or an amorphous basic aluminum magnesium carbonate;

b) a heat stabilizer comprising an organotin compound; and c) a polyhydroxyaliphatic costabilizer.

13 Claims, 2 Drawing Sheets

Stabilized HBCD in Polystyrene
Whiteness Index as Extruded

Whiteness Index as Extruded

Change in Whiteness

Stabilized HBCD in Polypropylene
Yellowness as Extruded

Initial Yellowness

Stabilized HBCD in Polypropylene
Yellowness after Heat Aging

Yellowness after Thermal Age

STABILIZER BLEND FOR ORGANIC POLYMER COMPOSITIONS; STABILIZED POLYMER COMPOSITIONS AND METHOD OF STABILIZING POLYMERS

FIELD OF THE INVENTION

This invention relates to a stabilizer blend used to protect organic polymer compositions from the deleterious effects of heat during processing and from the effects of thermal degradation, and to the articles produced therefrom.

BACKGROUND OF THE INVENTION AND PRIOR ART

Halogenated flame-retardants are widely used in polymer compositions to impart flame-retardant properties. However, halogenated flame-retardants, and particularly those containing aliphatic halogen, are susceptible to deterioration or degradation during processing in an organic polymer or upon subsequent thermal aging of the polymer composition. Hydrohalide acids such as HCl or HBr, that are generated during the processing or aging history, can both autocatalytically degrade the halogen-containing flame retardant and catalytically degrade the organic polymer. The ensuing chain scission typically results in undesirable lowered melt viscosity and discoloration of the composition.

Many compounds and compositions have been used to stabilize halogen-containing organic polymers during processing, during subsequent aging, and during recycling. Examples include organotin mercaptides, sulfides, and carboxylates, mixed metal stabilizer systems such as barium/cadmium, barium/zinc, and calcium/zinc, lead-based stabilizers such as sulfates, stearates, carbonates, phthalates, and phosphites, and metal-free systems based on aminocrotonic acid esters. These are discussed in Plastics Additives Handbook edited by R. Gachter and H. Muller, Hanser Publishers, 3rd Edition, pp. 281–300, hereby incorporated by reference.

Costabilizers are also used. They do not possess a thermo-stabilizing effect, but improve the effectiveness of one or more primary stabilizers. Examples include organic phosphites, epoxy compounds, polyols, phenolic antioxidants, 1,3-diketones, dihydropyridine, and betaketocarboxylic acid esters. These are discussed at pages 300–308 of the Plastics Additives Handbook referenced above, hereby incorporated by reference.

The prior art discloses the use of these stabilizers and costabilizers in single-stabilizer and multi-stabilizer systems. For example, U.S. Pat. Nos. 4,089,912, 4,183,846, 4,217,258, 4,219,605, 4,532,287, 4,558,083, 4,593,059, and 4,963,606, hereby incorporated by reference, disclose various systems containing dibutyltin maleate or other organotin compounds. U.S. Pat. Nos. 4,154,718, 4,299,759, 4,427,816, 5,106,898, 5,141,980, 5,216,058, and 5,234,981, hereby incorporated by reference, disclose systems incorporating hydrotalcite and similar stabilizer compounds.

Although these stabilizers have been known for many years, an improved solution to stabilizing flame-retarded polyolefin and polystyrene compositions is needed. Compounders prefer working at higher temperatures in order to increase their throughput, and the increased emphasis on recycling requires working with feed streams containing a variety of additives. Both scenarios require a robust stabilizer system to protect the polymer composition.

SUMMARY OF THE INVENTION

One aspect of the present invention is to provide an improved thermal, process, and recycle-enhancing stabilizer blend that resists process instability, thermal degradation of the stabilizer, and resists thermal degradation of the organic polymer being thermally stabilized during processing and aging, and provides a polymer composition that is recyclable.

It is another aspect of the present invention to provide a thermal stabilizer and flame-retardant blend for organic polymers such that the organic polymer containing the thermal stabilizer and flame retardant has improved process stability, recyclability, and heat-age stability.

It is an additional aspect of the present invention to provide a stabilized organic polymer that has improved process stability, recyclability, and heat-age stability.

It is still a further aspect of the present invention to provide a stabilized halogenated flame-retarded organic polymer that has improved process stability, recyclability, and heat-age stability.

It is yet another aspect of the present invention to provide a finished article containing a stabilizer blend that provides new and unexpected stability to the article.

Accordingly, the present invention is a stabilizer blend comprising:

a) an acid scavenger, for example a hydrotalcite or an amorphous basic aluminum magnesium carbonate;

b) a heat stabilizer comprising an organotin compound; and c) a polyhydroxyaliphatic costabilizer.

BRIEF DESCRIPTION OF THE DRAWINGS

The above and other aspects and advantages of the present invention will become more apparent from the following detailed description of the preferred embodiments of the present invention, taken in conjunction with the drawings, wherein.

DETAILED DESCRIPTION OF THE PREFERRED EMBODIMENTS

Figure 1:
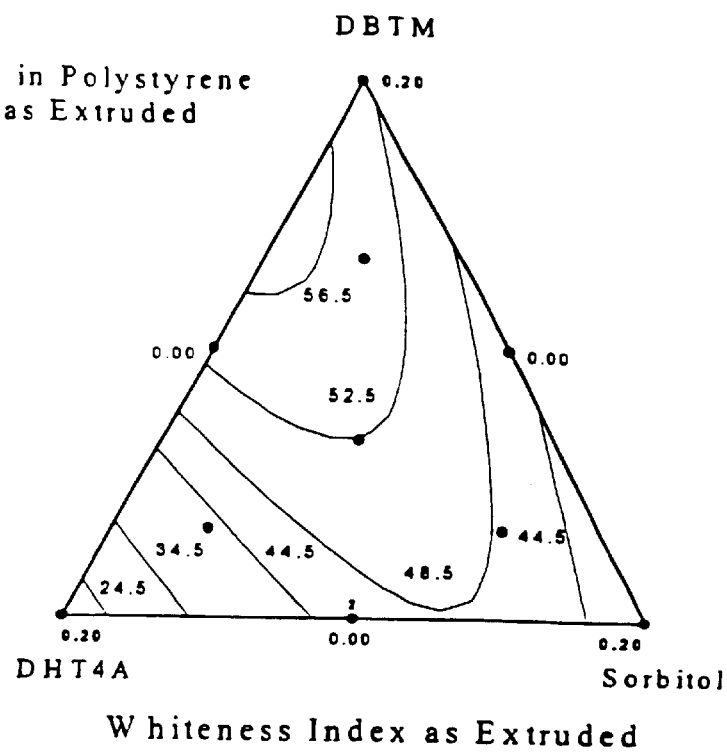
FIG. 1 is a graph showing the whiteness index, as extruded, for a hexabromocyclododecane flame retardant in polystyrene, containing varying percentages of a ternary blend of hydrotalcite (DHT4A); dibutyltin maleate (DBTM), and sorbitol.

The preferred acid scavengers for component a) are the hydrotalcites and amorphous basic aluminum magnesium carbonates, such as those described in U.S. Pat. Nos. 4,427,816, 5,106,898, and 5,234,981, hereby incorporated by reference. The acid scavenger is present in an amount in the range of about 5% to about 95% by weight, preferably, from about 10% to 50% by weight and most preferably from about 10% to 35% by weight. Percentages of the acid scavenger, compound a), as enumerated above, and of the heat stabilizer, compound b), and the polyhydroxyaliphatic compound, compound c), enumerated in the following two paragraphs, are weight percent values based on the weight of the three component stabilizer blend a), b), and c).

The preferred heat stabilizers, for use as component b) in this invention, are organotin stabilizers such as those described in U.S. Pat. No. 4,593,059, hereby incorporated by reference. The most preferred heat stabilizers are the organotin carboxylates exemplified by alkyl tin alkyl maleates, such as dibutyltin bis (butyl maleate), and polymeric alkyltin maleates, such as dibutyltin maleate (DBTM). The heat stabilizer is present in an amount in the range of about 5% to about 95% by weight, preferably from about 35% to about 90% by weight and most preferably from about 50% to about 80% by weight.

Examples of polyhydroxyaliphatic compounds suitable for component c) of the stabilizer blend of the present invention include triols exemplified by trimethylolpropane, glycerol, 1,2,6-hexanetriol, 1,2,4-butanetriol or trishydroxyethyl isocyanurate; tetrols such as pentaerythritol and diglycerol; pentitols such as xylitol and tetramethylolcyclohexanol; hexitols such as mannitol, sorbitol or dipentaerythritol; polyols which are partially esterified with a carboxylic acid and in the formula of which there are at least 3 free hydroxyl functional groups in the molecule; and polyvinyl alcohols. The most preferred polyols are mannitol, sorbitol, trimethylolpropane, neopentyl glycol, pentaerythritol, and mixtures of any 2 or more of the foregoing polyols. The polyhydroxyaliphatic costabilizer is present in an amount of about 1% to about 33% by weight, preferably from about 2% to about 15% by weight, and most preferably from about 5% to about 10%, based on the total weight of the stabilizer blend a), b), and c).

The stabilizer blend of the present invention is useful for stabilizing flame-retarded polymer compositions, particularly polymer compositions containing a halogenated flame retardant, from thermal degradation during processing and recycling, and from degradation due to heat-aging. The stabilizer blend of the present invention is particularly useful in stabilizing compositions incorporating one or more aliphatic halogen-containing flame-retardants. Examples of these include the halogenated cycloaliphatic flame-retardants, such as hexabromocyclododecane (CD-75P); tetrabromocyclooctane (BC-48); dibromoethyldibromocyclohexane (BCL-462); dibromomethyl dibromocyclopentane; pentabromomonochlorocyclohexane; hexabromocyclohexane; tetrabromotrichlorocyclohexane; tris(2,3-dibromopropyl) isocyanurate (FR-930 from AKZO); melamine hydrobromide (MBR-40 from Montedison); tetrabromobisphenol S bis(2,3-dibromopropyl ether) (Nonnen 52 from Marubishi Oil); and the like. Other examples of halogenated aliphatic flame-retardants include the bis (2,3-dibromopropyl ether) of tetrabromobisphenol A (PE-68), halogenated phosphate esters exemplified by tris (tribromoneopentyl) phosphate (PB-370), trischloropropyl phosphate, and tris(dichloropropyl) phosphate (TDCP), ethylene bis (dibromomonoborane) dicarboximide (BN-451), aliphatic chlorine containing polymers, such as chlorinated polyethylene (CPE), the Diels-Alder diadduct of hexachlorocyclopentadiene and 1,5-cyclooctadiene (Dechlorane Plus), dibromoneopentylglycol, and tribromoneopentylalcohol.

The stabilizer package described herein is suited for any thermoplastic polymer, and is useful in the production of molded parts, films, and fibers. When used in conjunction with halogenated flame-retardants, the combination of stabilizers a), b), and c) is best suited for thermoplastics that are processed at temperatures less than about 270° C. Examples include high and low density polyolefins, such as polyethylene, polypropylene, general-purpose polystyrene (GPPS), high impact polystyrene (HIPS), impact-modified polystyrene (IPS, both medium-impact polystyrene and high-impact polystyrene), acrylonitrile/styrene (AS) resins, butadiene/styrene (BS) resins, acrylonitrile/butadiene/styrene (ABS) resins, acrylic resins, methacrylic resins mixtures and copolymers of the foregoing, and the like.

Formulations can be prepared by any conventional manner of mixing or blending. Stabilizer load requirements in the formulation will increase both as the aliphatic halogen content of the formulation increases and as the processing temperature increases. Guidelines for calculating the stabilizer requirements are as follows:

1. The level of acid scavenger, expressed as a weight percentage of the aliphatic halogen content of the polymer composition, is 0.2% to 6%, preferably 0.83–2.9%.
2. The level of the heat stabilizer, expressed as a weight percentage of the aliphatic halogen content of the polymer composition, is 1% to 20%, preferably 4.3–9.6%.
3. The level of the polyhydroxyaliphatic costabilizer compound, expressed as a weight percentage of the aliphatic halogen content of the polymer composition, is 0.1% to 2.5%, preferably 0.44–1.2%.

In the formulation of the polymeric compositions according to the invention there can be present, furthermore, common additives, such as antioxidants, UV-stabilizers and metal stabilizers, lubricants, pigments and nucleating agents, as conventionally used, in amounts up to about 3% by weight each, calculated based on the total weight of the composition.

Reference will now be made to specific examples of compositions described above. It is to be understood that the examples are provided to more completely describe preferred embodiments, and that no limitation of the scope of the invention is intended thereby.

General Experimental Procedure

The stabilizer components a), b), and/or c) are weighed into a thermoplastic resin and the mixture is thoroughly hand-mixed in a poly bag. The material is compounded on a Berstorff ZE-25 twin-screw extruder at the conditions described in each of the examples A belt feeder was used to feed the formulation mixture to the throat (barrel 1) of the extruder. The throat was cooled to 80–90° F. The formulation strands were cooled in a six foot water bath at ~75–80° F., then air-dried and pelletized using a Conair/Jetro Model #304 pelletizer.

EXAMPLE 1
Processing Stability Of Formulations Containing Single- And Multi-Component Stabilizer Packages For Hexabromocyclododecane In Polystyrene.

| Formulation | A | B | C | D | E | F | G | H | I | J |
|---|---|---|---|---|---|---|---|---|---|---|
| a) % DHT4A | 0.2 | 0 | 0 | 0.1 | 0.1 | 0 | 0.133 | 0.033 | 0.033 | 0.067 |
| b) % DBTM | 0 | 0.2 | 0 | 0.1 | 0 | 0.1 | 0.033 | 0.133 | 0.033 | 0.067 |
| c) % Sorbitol | 0 | 0 | 0.2 | 0 | 0.1 | 0.1 | 0.033 | 0.033 | 0.133 | 0.067 |
| WIE as Extruded | 16.0 | 53.6 | 41.2 | 53.1 | 46.8 | 49.5 | 50.1 | 53.4 | 42.2 | 49.5 |
| WIE Pass 2 | | 47.4 | 22.8 | 47.8 | 35.1 | 44.4 | 44.4 | 47.4 | 42.6 | 46.7 |
| Change in Whiteness | | −6.2 | −18.4 | −5.3 | −11.7 | −5.1 | −5.7 | −6.0 | 0.3 | −2.9 |

Each of the examples tabulated above contains 4% by weight hexabromocyclododecane and 2% by weight titanium dioxide in addition to the specified stabilizer packages. These examples were formulated in polystyrene resin and compounded under conditions shown hereinafter.

Pellets from the initial pass through the extruder were fed back into the extruder under identical processing conditions, with the resultant pellets identified as Pass 2 material. The tristimulus color of the pellets was determined on a Pacific Scientific Colorgard System.

Figure 2:
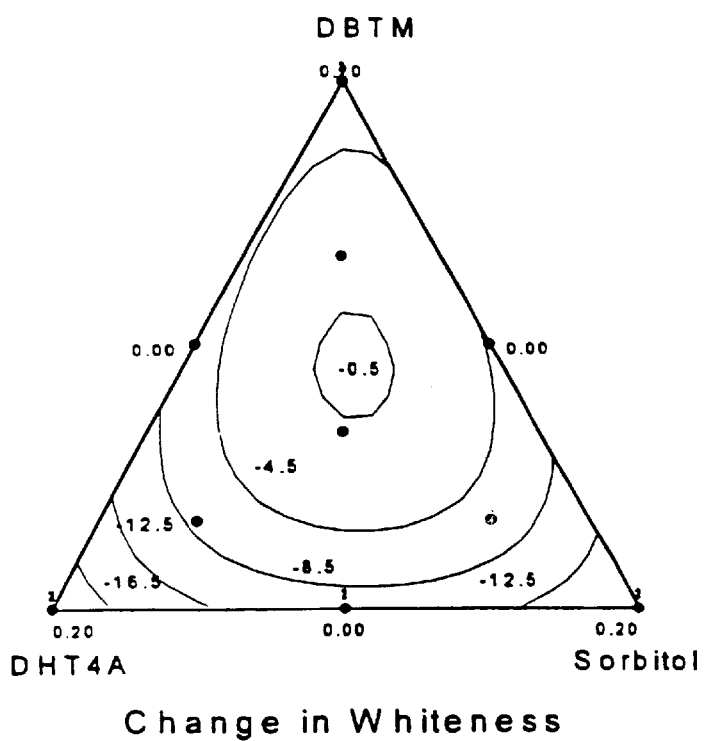
FIG. 2 is a graph showing color stability of high impact polystyrene, containing a hexabromocyclododecane flame retardant, containing varying percentages of a ternary blend of hydrotalcite (DHT4A); dibutyltin maleate (DBTM); and sorbitol.

The whiteness index (WIE) of the initial pass extruded pellets is shown in FIG. 1. The change in whiteness index between the Pass 2 pellets and the initial pass extruded pellets is shown in FIG. 2.

| Compounding Conditions on Berstorff ZE-25 Twin Screw Extruder | | | |
|---|---|---|---|
| Barrel 2 Temperature, ° C. | 230 | Screw Speed, rpm | 200 |
| Barrel 3 Temperature, ° C. | 230 | | |
| Barrel 4 Temperature, ° C. | 230 | Typical Melt Temp, ° C. | 245 |
| Barrel 5 Temperature, ° C. | 230 | Typical Melt Pressure, psi | 190 |
| Barrel 6 Temperature, ° C. | 230 | | |
| Barrel 7 Temperature, ° C. | 230 | | |
| Die Temperature, ° C. | 230 | | |

Referring now to the drawings, FIG. 1 shows the contours of constant whiteness index (WIE) for the compositions of Example 1. Higher values of whiteness index (WIE) are preferred.

The data from Example 1, and FIG. 1, show that the best initial color is obtained by mixtures containing DBTM as the major component of the stabilizer blend (see formulation H). The data further demonstrates the increased efficacy of stabilizer blends compared to the single components a), b), or c).

Color stability after multiple extrusion is a measure of processing stability and recyclability. FIG. 2 shows the change in WIE (Pass 2–Pass 1) when each formulation is passed through the extruder a second time under identical compounding conditions.

The contours of FIG. 2 show a constant value for the change in whiteness index. Values close to zero, noting no change in the whiteness index, are located near the centerpoint of the graph.

FIG. 2 demonstrates that ternary blends are necessary for optimal stabilization. Use of single components or dual component combinations, at equivalent loadings to optimal ternary combinations, is not sufficient to achieve the level of stabilization obtained with the ternary blends.

In the following Example 2, various polyhydroxyaliphatic compounds were incorporated into a high impact polystyrene polymer containing 4% by weight hexabromocyclododecane (HBCD); 0.15% by weight dibutyltin maleate (DBTM); and 0.05% by weight hydrotalcite (DHT4A).

EXAMPLE 2

Molding Stability Of Hexabromocyclododecane (HBCD) In High Impact Polystyrene (HIPS) Comparison Of Stabilizer Component c): Polyhydroxyaliphatic Compounds

| Formulation | K | L | M | N | O |
|---|---|---|---|---|---|
| % Pentaerythritol | 0.02 | 0 | 0 | 0 | 0 |
| % Trimethylol propane | 0 | 0.02 | 0 | 0 | 0 |
| % Sorbitol | 0 | 0 | 0.02 | 0 | 0 |
| % Neopentyl glycol | 0 | 0 | 0 | 0.02 | 0 |
| Color Stability Ranking | 3 | 2 | 1 (best) | 4 | 5 (worst) |

Each of the above formulations K–O were compounded in HIPS under the conditions shown below.

| Compounding Conditions on W & F Twin Screw Extruder | |
|---|---|
| Barrel 2 Temperature, ° C. | 180 |
| Barrel 3 Temperature, ° C. | 185 |
| Barrel 4 Temperature, ° C. | 185 |
| Barrel 5 Temperature, ° C. | 190 |
| Barrel 6 Temperature, ° C. | 190 |
| Barrel 7 Temperature, ° C. | 190 |
| Barrel 8 Temperature, ° C. | 190 |
| Barrel 9 Temperature, ° C. | 185 |
| Die Temperature, ° C. | 185 |

Each formulation K–O was subjected to abusive molding on a BOY T2 injection molding machine using the following temperature profile: 210° C.–215° C. nozzle. The mold temperature was 40° C. Each formulation was purged for 30 seconds prior to molding test plaques (7.7 mm×10.2 mm×3.2 mm). A total of 21 plaques were molded for each formulation, with a 3 minute hold time between plaque 20 and plaque 21. The thermal stability of each formulation was determined by visually inspecting the color formation of the plaques.

Rankings from best (least discoloration) to worst (most discoloration) are tabulated above. This example demonstrates that the addition of a polyhydroxy aliphatic compound to the binary DBTM/DHT4A mixture significantly improves the thermal stability of the thermoplastic polymer, and further demonstrates that sorbitol is the preferred polyhydroxy aliphatic compound for this application.

The following Examples 3 and 4 compare the stabilizing efficacy of the ternary blend of stabilizers of the present invention, unstabilized thermoplastic polymers (HIPS), and thermoplastic polymers (HIPS) containing commercially available stabilizers.

EXAMPLE 3

Processing Stability Of Hexabromocyclododecane (HBCD) Flame Retardant In High Impact Polystyrene (HIPS) Comparison To Unstabilized And Commercially Available Systems

| Formulation | P | Q | R | S |
|---|---|---|---|---|
| Stabilization Pkg | Unstabilized | A | B | C |
| Yellowness Index | | | | |
| Pass 1 | 12.4 | 12.9 | 9.7 | 8.7 |
| Pass 2 | N/A | 14.7 | 13.3 | 11.1 |
| Pass 3 | N/A | 17.1 | 16.5 | 14.7 |
| Whiteness Index | | | | |
| Pass 1 | 23.8 | 41.3 | 50.7 | 52.8 |
| Pass 2 | N/A | 28.9 | 40.8 | 44.8 |
| Pass 3 | N/A | 18.9 | 31.8 | 34.2 |

Each of the HIPS examples tabulated above contains 4% hexabromocyclododecane. They were compounded under the conditions shown below.

A=A commercially available product from Great Lakes Chemical Corporation (SP-75) which is a stabilized hexabromocyclododecane, typically used in polystyrene foam production.

B=A commercially available product from Great Lakes Chemical Corporation (BR-E-5300) which is a stabilized hexabromocyclododecane, typically used in glow-wire HIPS applications.

C=A ternary blend of 0.026% DHT4A+0.16% DBTM+0.014% sorbitol (percentages based on the total formulation).

| Compounding Conditions on Berstorff ZE-25 Twin Screw Extruder | | | |
|---|---|---|---|
| Barrel 2 Temperature, ° C. | 220 | Screw Speed, rpm | 200 |
| Barrel 3 Temperature, ° C. | 220 | | |
| Barrel 4 Temperature, ° C. | 220 | Typical Melt Temp, ° C. | 239–241 |
| Barrel 5 Temperature, ° C. | 220 | Typical Melt Pressure, psi | 220–230 |
| Barrel 6 Temperature, ° C. | 220 | | |
| Barrel 7 Temperature, ° C. | 220 | | |
| Die Temperature, ° C. | 230 | | |

The unstabilized formulation turned gray on the initial pass through the extruder; subsequent passes were not made with this material.

The multipass extrusion data demonstrate that the ternary blend (formulation S) exhibits better initial color and better color stability than two examples of commercial product currently available for this application.

EXAMPLE 4

Processing Stability Of Hexabromocyclododecane (HBCD) Flame Retardant In Crystal Polystyrene Comparison To Unstabilized And Commercially Available Systems

| Formulation | T | U | V |
|---|---|---|---|
| Stabilization Pkg | A | B | C |
| Yellowness Index | | | |
| Pass 1 | 6.5 | 10.0 | 3.4 |
| Pass 2 | 8.6 | 18.4 | 7.8 |
| Pass 3 | 12.6 | 26.1 | 11.2 |
| Pass 4 | 16.5 | 31.6 | 14.5 |
| Whiteness Index | | | |
| Pass 1 | 37.4 | 28.3 | 42.4 |
| Pass 2 | 34.5 | 15.9 | 34.1 |
| Pass 3 | 26.9 | 6.4 | 28.3 |
| Pass 4 | 20.1 | 0.7 | 21.4 |

Each of the HIPS examples tabulated above contains 4% hexabromocyclododecane. They were compounded under the conditions shown below.

A=A commercially available product from Great Lakes Chemical Corporation (SP-75) which is a stabilized hexabromocyclododecane, typically used in polystyrene foam production.

B=A commercially available product from Great Lakes Chemical Corporation (BR-E-5300) which is a stabilized hexabromocyclododecane and glow-wire HIPS applications.

C=A ternary blend of 0.026% by weight DHT4A=0.16% by weight DBTM=0.0141% by weight sorbitol (percentages based on the total formulation).

| Compounding Conditions on Berstorff ZE-25 Twin Screw Extruder | | | |
|---|---|---|---|
| Barrel 2 Temperature, ° C. | 200 | Screw Speed, rpm | 200 |
| Barrel 3 Temperature, ° C. | 200 | | |
| Barrel 4 Temperature, ° C. | 200 | Typical Melt Temp, ° C. | ~220 |
| Barrel 5 Temperature, ° C. | 200 | Typical Melt Pressure, psi | 310–410 |
| Barrel 6 Temperature, ° C. | 200 | | |
| Barrel 7 Temperature, ° C. | 200 | | |
| Die Temperature, ° C. | 200 | | |

The multipass extrusion data demonstrate that the ternary blend (Formulation V) exhibits superior initial color and better color stability than two examples of commercial product currently available.

Figure 3:
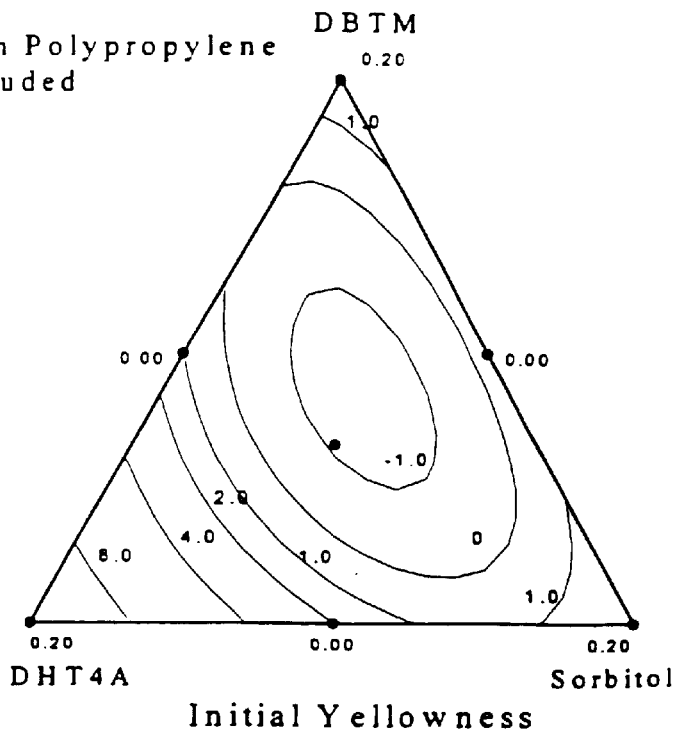
FIG. 3 is a graph showing yellowness index, as extruded, for a hexabromocyclododecane flame retardant in polypropylene, containing varying percentages of a ternary blend of hydrotalcite (DHT4A); dibutyltin maleate (DBTM), and sorbitol.
Figure 4:
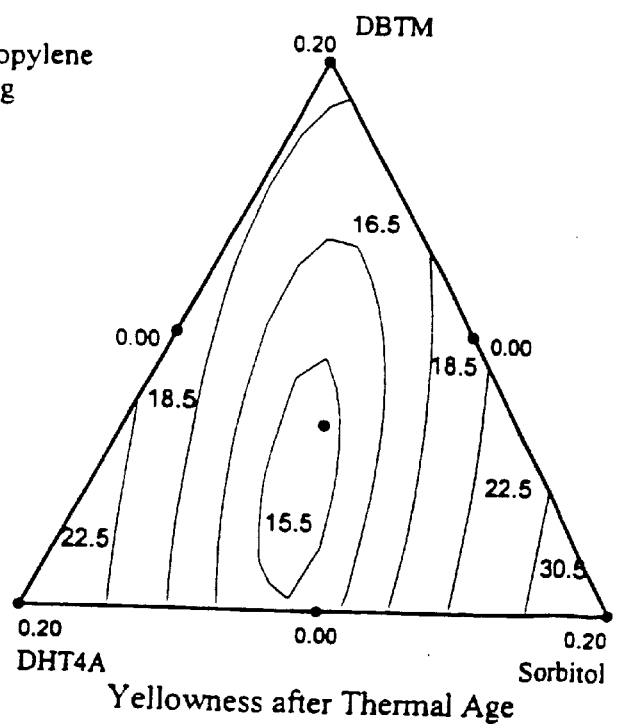
FIG. 4 is a graph showing the heat-age stability of polypropylene, containing a hexabromocyclododecane flame retardant, containing varying percentages of a ternary blend of hydrotalcite (DHT4A); dibutyltin maleate (DBTM), and sorbitol.

The following Example 5, and FIGS. 3 and 4, demonstrate the superior processing stability, heat-age stability; and color stability for halogen flame retardant-containing polypropylene.

EXAMPLE 5

Processing Stability And Heat Age Stability Of Formulations Containing Single- And Multi-Component Stabilizer Packages In Flame-Retarded Polypropylene

| Formulation | W | X | Y | Z | AA | AB | AC |
|---|---|---|---|---|---|---|---|
| a) % DHT4A | 0.2 | 0 | 0 | 0.1 | 0.1 | 0 | 0.067 |

-continued

Processing Stability And Heat Age Stability Of Formulations
Containing Single- And Multi-Component Stabilizer Packages
In Flame-Retarded Polypropylene

| Formulation | W | X | Y | Z | AA | AB | AC |
|---|---|---|---|---|---|---|---|
| b) % DBTM | 0 | 0.2 | 0 | 0.1 | 0 | 0.1 | 0.067 |
| c) % Sorbitol | 0 | 0 | 0.2 | 0 | 0.1 | 0.1 | 0.067 |
| YID as Extruded | 12.8 | 1.8 | 2.3 | 1.0 | 2.0 | 0.4 | −1.1 |
| YID after Heat Age | 31.8 | 19.7 | 42.8 | 19.5 | 14.7 | 19.9 | 18.0 |

Each of the Formulations W–AC tabulated above contains 5% by weight hexabromocyclododecane, 0.1% by weight calcium stearate, 0.05% by weight phosphite stabilizer, and 0.05% by weight phenolic stabilizer in barefoot polypropylene resin, based on the total weight of the Formulations. Compounding conditions are tabulated below.

Heat age conditions: 150° C. for 25 hours in a forced-air oven.

| Compounding Conditions on Berstorff ZE-25 Twin Screw Extruder | | | |
|---|---|---|---|
| Barrel 2 Temperature, ° C. | 195 | Screw Speed, rpm | 200 |
| Barrel 3 Temperature, ° C. | 200 | | |
| Barrel 4 Temperature, ° C. | 200 | Typical Melt Temp, ° C. | ~220 |
| Barrel 5 Temperature, ° C. | 200 | Typical Melt Pressure, psi | 210–230 |
| Barrel 6 Temperature, ° C. | 200 | | |
| Barrel 7 Temperature, ° C. | 200 | | |
| Die Temperature, ° C. | 205 | | |

FIG. 3 shows the contours of constant yellowness index (YID) resulting from one pass through the extruder. Lower values of yellowness index (YID) are preferred.

Example 5 demonstrates the superiority of ternary blends over single- and binary-component stabilizer packages in the processing stability of flame-retarded polypropylene.

FIG. 4 shows the contours of constant yellowness index (YID) for the formulations of Example 5 that were heat aged at 150° C. for 25 hours.

FIG. 4 demonstrates the superiority of ternary blends over single- and binary-component stabilizer packages in the heat age stability of flame-retarded polypropylene.

What is claimed is:

1. A stabilized, flame retarded polymer composition comprising:
   (a) a polymer selected from the group consisting of high density polyethylene; low density polyethylene; polypropylene; general-purpose polystyrene; impact-modified polystyrene; medium-impact polystyrene; high-impact polystyrene; acrylonitrile/styrene resins; butadiene/styrene resins; acrylonitrile/butadiene/styrene resins; acrylic resins; methacrylic resins; and a mixture thereof;
   (b) an effective amount of halogenated flame retardant;
   (c) an acid scavenger selected from the group consisting of a hydrotalcite; an amorphous basic aluminum magnesium carbonate; and a mixture thereof, in an amount of about 0.2% to about 6.0% by weight, based on the total weight of aliphatic halogen content in the composition;
   (d) an organotin heat stabilizer in an amount of about 1.0% to about 20% by weight, based on the total weight of aliphatic halogen content in the composition; and
   (e) a polyhydroxy aliphatic costabilizer in an amount of about 0.1% to about 2.5% by weight, based on the total weight of aliphatic halogen content in the composition.

2. The stabilized, flame retarded polymer composition of claim 1, wherein the organotin heat stabilizer is selected from the group consisting of an organotin carboxylate; an alkyltin maleate; an alkyltin alkyl maleate; a dialkyltin bis (alkyl maleate); a polymeric alkyltin maleate; and a mixture thereof, wherein the alkyl is a straight or branched chain alkyl moiety having 1–8 carbon atoms.

3. The stabilized, flame retarded polymer composition of claim 2, wherein the alkyl is a straight or branded chain alkyl moiety having 1–6 carbon atoms.

4. The stabilized, flame retarded polymer composition of claim 3, wherein the alkyl is butyl.

5. The stabilized, flame retarded polymer composition of claim 1, wherein the polyhydroxy aliphatic costabilizer has at least 3 hydroxy groups and is selected from the group consisting of triols; tetrols; pentitols; hexitols; a partially carboxylic acid-esterified polyol having at least three free hydroxy functional groups in the molecule; a polyhydric alcohol; and a mixture of at least two of the foregoing.

6. The stabilized, flame retarded polymer composition of claim 5, wherein the carboxylic acid used to partially esterify the polyol has 1–19 carbons atoms in the molecule.

7. The stabilized, flame retarded polymer composition of claim 1, wherein the halogenated flame retardant is selected from the group consisting of hexabromocyclododecane, tetrabromocyclooctane, dibromoethyldibromocyclohexane, dibromomethyldibromocyclopentane, pentabromomonochlorocyclohexane, hexabromocyclohexane, tetrabromotrichlorocyclohexane, an aliphatic chlorine-containing polymer, 2-3-dibromopropyl ether of tetrabromobisphenol A, a halogenated phosphate ester, tris (2,3-dibromopropyl) isocyanurate, melamine hydrobromide, tetrabromobisphenol S bis(2,3-dibromopropyl ether), and a mixture of at least two of the foregoing.

8. The stabilized, flame retarded polymer composition of claim 7, wherein the halogenated flame retardant is a halogenated phosphate ester or a chlorine-containing polymer.

9. The stabilized, flame retarded polymer composition of claim 8, wherein the halogenated flame retardant is a halogenated phosphate ester selected from the group consisting of trischloropropyl phosphate; tris(dichloropropyl) phosphate; tris(tribromoneopentyl) phosphate; and mixtures.

10. The stabilized, flame retarded polymer composition of claim 9, wherein the halogenated phosphate ester is tris (tribromoneopentyl) phosphate.

11. The stabilized, flame retarded polymer composition of claim 1, wherein the composition is processed at a temperature less than about 270° C.

12. The stabilized, flame retarded polymer composition of claim 1, wherein the polymer is a polyolefin.

13. A method of stabilizing a styrene or polyolefin polymer, comprising adding to said polymer, stabilized with an effective amount of a halogenated flame retardant:
   (a) an acid scavenger selected from the group consisting of a hydrotalcite; an amorphous basic aluminum magnesium carbonate; and a mixture thereof, in an amount of about 0.2% to about 6.0% by weight, based on the total weight of aliphatic halogen content in the composition;
   (b) an organotin heat stabilizer in an amount of about 1.0% to about 20% by weight, based on the total weight of aliphatic halogen content in the composition; and
   (c) a polyhydroxyaliphatic costabilizer in an amount of about 0.1% to about 2.5% by weight, based on the total weight of aliphatic halogen content in the composition.

* * * * *